United States Patent [19]
Liu

[11] Patent Number: 6,097,464
[45] Date of Patent: Aug. 1, 2000

[54] MULTI-DOMAIN HOMEOTROPIC ALIGNED LIQUID CRYSTAL DISPLAY HAVING CRUCIFORM BUMPS FORMED AROUND PIXEL ELECTRODES

[75] Inventor: Hong-Da Liu, Juipei, Taiwan

[73] Assignee: Industrial Technology Research Institute

[21] Appl. No.: 09/484,395

[22] Filed: Jan. 14, 2000

[30] Foreign Application Priority Data

Nov. 18, 1999 [TW] Taiwan ................................ 088120131

[51] Int. Cl.$^7$ .................................................. G02F 1/1337
[52] U.S. Cl. ........................... 349/130; 349/122; 349/123
[58] Field of Search ..................... 349/130, 123, 349/122

[56] References Cited

U.S. PATENT DOCUMENTS

| | | | |
|---|---|---|---|
| 5,309,264 | 5/1994 | Lien et al. | 359/87 |
| 5,737,051 | 4/1998 | Kondo et al. | 349/41 |
| 5,914,761 | 6/1999 | Ohe et al. | 349/132 |

OTHER PUBLICATIONS

ASIA Display 98, 375 Wide Viewing Angle TFT–LCD Based on Rdge and Fringe–Field Multi–Domain Homeotropic Structure, 1998.
SID 98 Digest. Ridge and Fringe–Field Multi–Domain Homeotropic LCD, 1998.
SID 98 Digest. A Super–High–Image–Quality Multi–Domain Vertical Alignment LCD by New Rubbing–Less Technology, 1998.
SID 98Digest. 1077–1080 1998 A Super–Hight–Image–Quality Multi–Domain Vertical Alignment LCD.
SID 98 Digest. 1998 Ridge and Fringe–Field Multi–Domain Homeotropic.
ASIA Display 98.375 LCD Wide Viewing Angle TFT–LCD Based on Ridge and Fringe–Field Multi–Domain Homeotropic Structure.

*Primary Examiner*—Kenneth Parker
*Assistant Examiner*—Mike Qi

[57] ABSTRACT

A multi-domain homeotropic aligned liquid crystal display has cruciform bump structures formed around pixel electrodes. The cruciform bump structures are fabricated on a substrate of a color filter or a thin film transistor. The bump structures orient liquid crystal molecules with a pre-tilted angle which results in the alignment of liquid crystal molecules to form four-domain textures after a voltage is applied. A standard photo-lithographic process or a back side exposure method is used to manufacture the bump structures. The back side exposure method has the advantages of being simple and clean. It avoids electric static damage and particle pollution. The liquid crystal panel provides an extremely wide viewing angle of more than 140°, a high contrast ratio of more than 700, and fast response of less than 30 ms. The light intensity of the liquid crystal mode can reach up to 55% of that of a conventional 90°-twisted nematic LCD, and is 20% higher than that of a conventional vertically aligned wide-viewing angle LCD.

29 Claims, 17 Drawing Sheets

MULTI-DOMAIN HOMEOTROPIC ALIGNED LIQUID CRYSTAL DISPLAY HAVING CRUCIFORM BUMPS FORMED AROUND PIXEL ELECTRODES

FIELD OF THE INVENTION

The present invention relates generally to a structure of a multi-domain liquid crystal display (MD-LCD) and its manufacturing method, and more specifically to a structure of a multi-domain homeotropic aligned liquid crystal display (MHA-LCD) with cruciform bumps forming around pixel electrodes and the method for manufacturing the structure.

BACKGROUND OF THE INVENTION

The market for LCD's is increasing rapidly, especially in their applications to notebook PCs and monitors. When LCD panels of larger size and higher resolution are used for desktop monitors, a wide-viewing angle (WVA) and fast response time become very critical in meeting the monitors' requirements. In addition to contrast ratio with respect to different viewing angles, gray-scale inversion, colorimetry, and the optical response of a LCD are important factors of a high quality LCD panels. However, the cost associated with designing and manufacturing a panel also needs to be considered.

Controlling liquid crystal domains is the most important technology in obtaining a wide-viewing angle for a vertically aligned LCD. Most of the conventional LCD's are 90° twisted nematic (TN) LCD's having a LCD panel and crossed polarizers attached outside. The drawbacks of the conventional LCD's include narrow viewing angles (±40° horizontally and ±30° vertically), slow response (about 50 ms), and large color dispersion. Therefore, it is difficult to make high quality LCD panels. Also, the rubbing process required in manufacturing the panels causes electric static damage (ESD) and particle pollution.

Because of the demand in high quality LCD panels with a wide-viewing angle, the structure of multi-domain vertically aligned LCDs has been developed. Such LCD panels have compensation films and crossed polarizers outside the liquid crystal display panel. The liquid crystal mode is multi-domain vertically aligned. The LCD panel has a wide-viewing angle and small color dispersion. In addition, it does not have electric static damage and particle pollution problems because no rubbing process is required.

Several different structures for the conventional multi-domain vertically aligned LCD's have been designed. For example, the ridge and fringe field homeotropic aligned (RFFHA) structure of IBM has a Y and inversed-Y shaped bump structure as shown in FIG. 1. The Y and inversed-Y shaped bump structure is formed in the central portion of a pixel electrode. Fujitsu's multi-domain vertically aligned (MVA) structure has W-shaped bump structures as shown FIG. 2. The W-shaped bump structures are formed on both upper and lower substrates. Although the rubbing process has been eliminated in manufacturing these LCD panels, complicated manufacturing steps are required. For example, it is necessary to form bump structures on both upper and lower substrates for Fujitsu's structure.

SUMMARY OF THE INVENTION

The present invention has been made to overcome the drawbacks of the conventional structure of a multi-domain vertically aligned LCD mentioned above. The primary object of the present invention is to provide a structure of a multi-domain homeotropic aligned liquid crystal display with cruciform bumps forming around pixel electrodes. The structure of the cruciform bump in present invention is constructed on a substrate that has a color filter or a thin film transistor (TFT).

In a preferred embodiment of the cruciform bumps of the present invention, the cruciform bumps are formed around the pixel electrodes. Because of the bump structure, the liquid crystal molecules are pre-tilted with high tilt angles which result in orderly alignment of liquid crystal molecules after an external electric field is applied. Consequently, four domains are formed.

The cruciform bump in the present invention provides the advantages of optical response faster than 30 ms, an all viewing angle larger than 140°, a high contrast ratio (CR) more than 700, response faster than 16.5 ms on some gray levels and small color dispersion. Moreover, the horizontal and vertical viewing angles can be as large as 50° when the CR is more than 200.

Another object of the present invention is to provide the method of manufacturing the above-mentioned cruciform bump structure of the MHA-LCD. Standard photo-lithographic process or back side exposure (BSE) method is used to manufacture the cruciform bump structure of this invention. The advantages of this manufacturing method are fast, simple, clean and no pollution. The method requires only one substrate with bumps fabricated thereon to form multi-domain cells. Therefore, the light intensity of the liquid crystal mode can reach up to 55% of that of a 90° twisted nematic LCD, and is 20% higher than that of a conventional vertically aligned wide-viewing angle LCD.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

The operating principle of the multi-domain homeotropic aligned liquid crystal display mode in this invention is a combination effect of a fringe field and bump structure. Based on the effect, multi-domain units are formed to provide a wide-viewing angle. According to this invention, the tilt direction of liquid crystal molecules can be controlled when a voltage is applied. Cruciform bump structures are constructed on a color filter or TFT substrate. Compensation films and crossed polarizers are attached outside a liquid crystal display panel.

Figure 1:
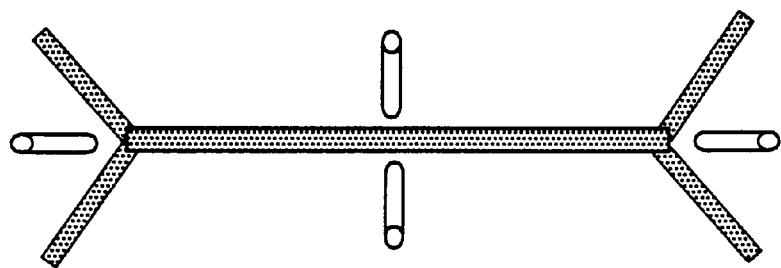
FIG. 1 is a diagram of the conventional multi-domain vertically aligned LCD illustrating the "double-Y" shaped bump structure of IBM's RFFHA-LCD.
Figure 2:
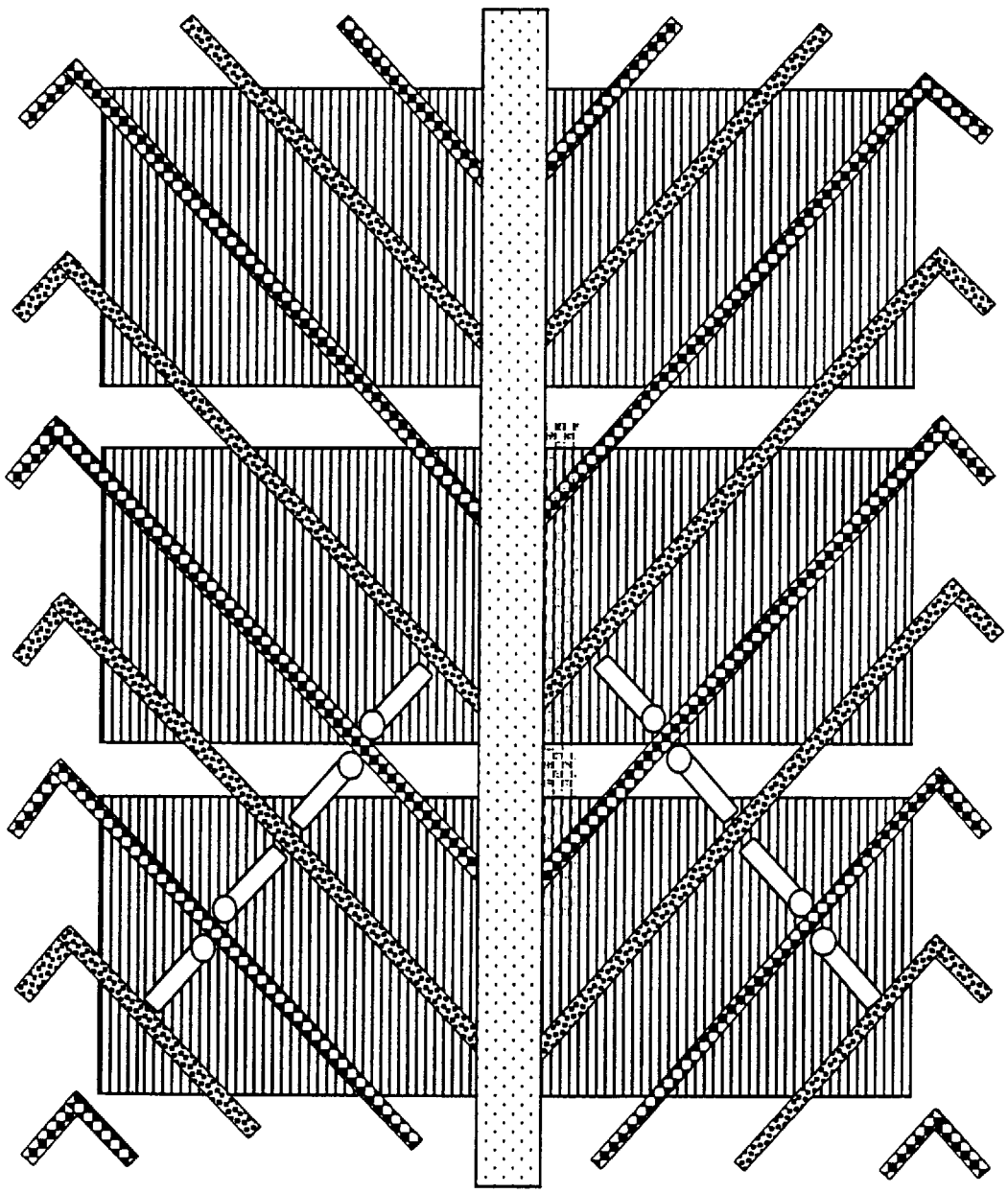
FIG. 2 is a diagram of another conventional multi-domain vertically aligned LCD illustrating the W shaped bump structure of Fujitsu's MVA-LCD.
Figure 3:
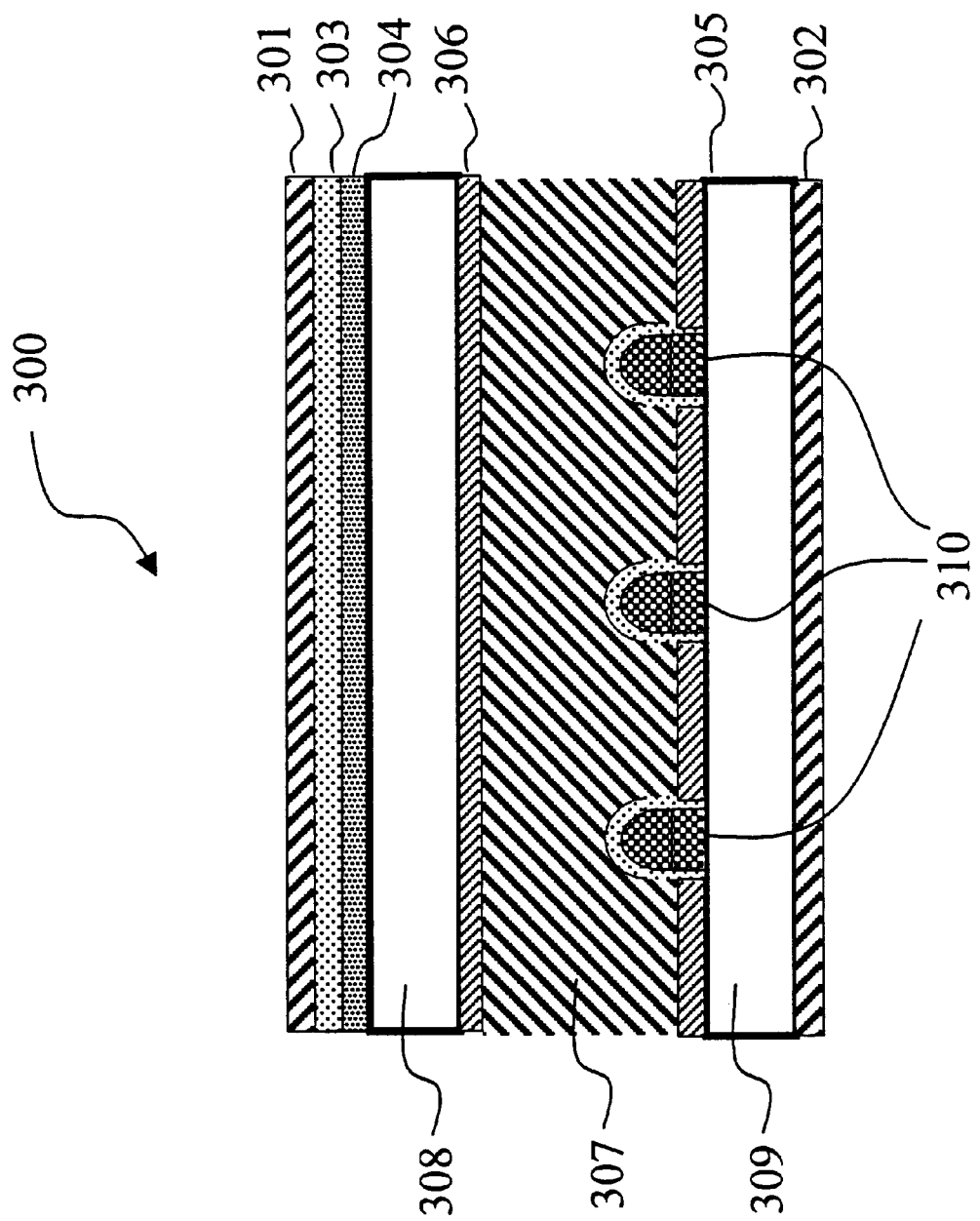
FIG. 3 is a cross-sectional view of a multi-domain homeotropic aligned liquid crystal display according to the invention.

FIG. 3 is a cross-sectional view of a multi-domain homeotropic aligned liquid crystal display according to the invention. Referring to FIG. 3, the LCD structure 300 comprises a liquid crystal cell, a pair of crossed polarizers 301 and 302, compensation films 303 and 304, and a cruciform bump structure 310. The liquid crystal cell comprises a pixel electrode layer 305, a common electrode layer 306 and a pair of parallel substrates 308 and 309 filled with liquid crystals 307. The crossed polarizers 301 and 302 are attached outside the liquid crystal cell. The compensation films 303 and 304 are located between the crossed polarizers 301 and 302. The cruciform bump structure 310 is built around the pixel electrode. The compensation films can be combinations of negative birefrigence and uni-axial birefrigence, such as a C-plate and an A-plate or at least one bi-axial film.

The pixel electrode may be a pixel unit driven by a switching device of an active matrix. Its structure can be co-plane with, above, or below the active matrix. The active matrix may be a thin film transistor made of amorphous silicon, single silicon, poly-silicon, or low temperature poly-silicon, or a plasma address device.

According to the invention, the cruciform bumps formed around the pixel electrode are fabricated by a standard photo-lithographic process or a self-aligned BSE method. In general, the steps of fabricating cruciform bumps by using a standard photo-lithographic process include substrate formation, coating, pre-bake, exposure, development, mid-bake and hard-bake. A substrate with controlling devices such as thin film transistors and electrode layers is first prepared. Then, the top surface of the substrate is coated with a photoresist layer. The substrate coated with photoresist is placed on a hot plate for pre-bake. A photomask is then used to cover and pattern the substrate by exposing the substrate to light from its front side. The substrate is then developed to form the bump structure. The shape of the bump is further improved in a mid-bake step. Finally, the bump is harden.

Figure 4A:
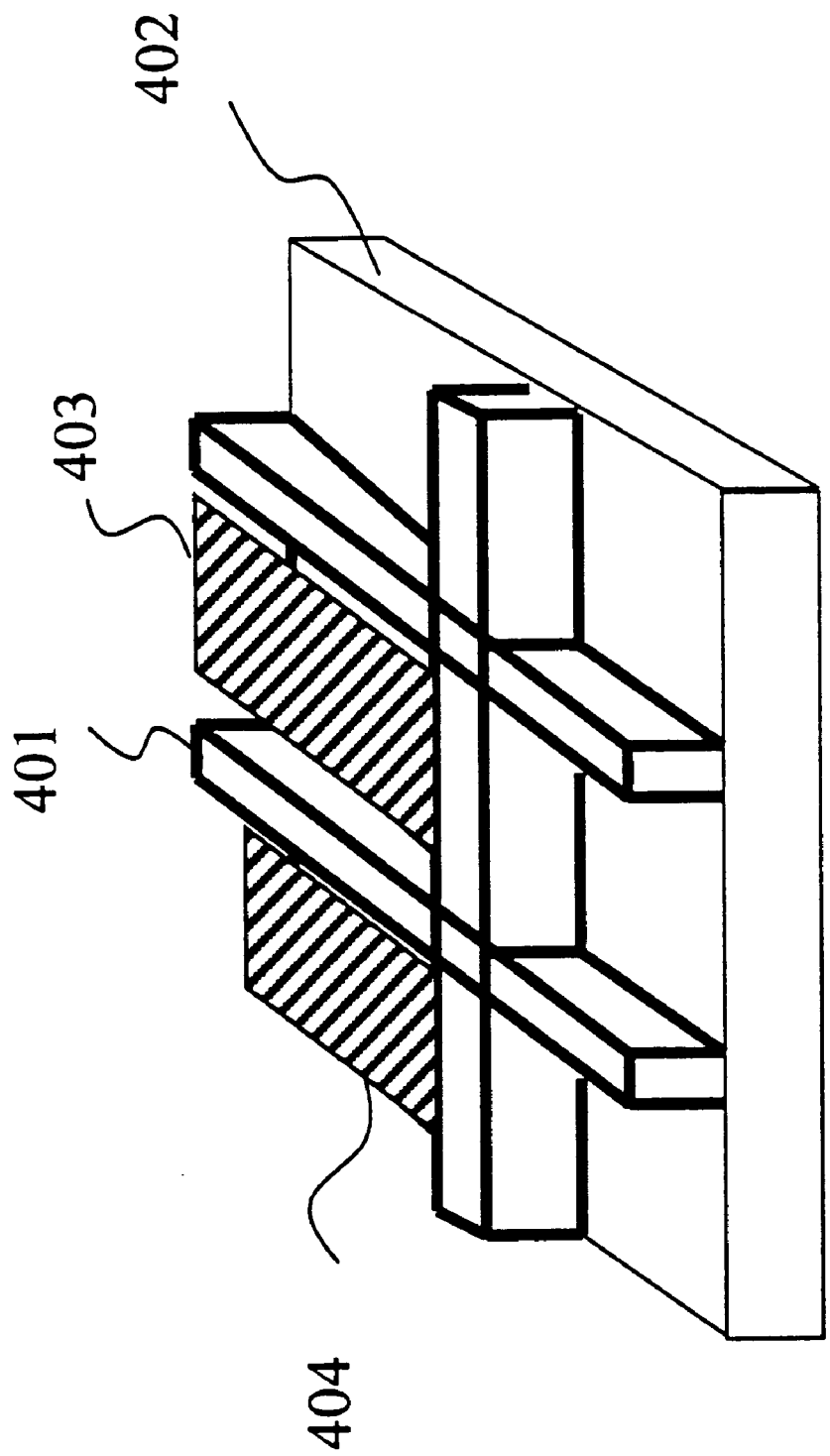
FIG. 4a is a top view of a cruciform bump formed around a pixel electrode in a multi-domain homeotropic aligned liquid crystal display according to the invention.

In a preferred embodiment of the invention, the cruciform bumps are formed around the pixel electrodes. Those bumps direct and pre-tilt liquid crystal molecules with high tilt angles which result in the alignment of liquid crystal molecules to form four-domain textures after a voltage is applied. The cruciform bumps can be fabricated either on the top or on the bottom of the electrode layer. FIG. 4a is a top view of the cruciform bumps formed around a pixel electrode in a multi-domain homeotropic aligned liquid crystal display of the present invention. As shown in FIG. 4a, a polymer bump structure 401 is built on the bus line of a thin film transistor substrate 402. The bump structure 401 around the pixel electrodes 403 and 404 of the thin film transistor substrate 402 has a double cross shape.

Figure 4B:
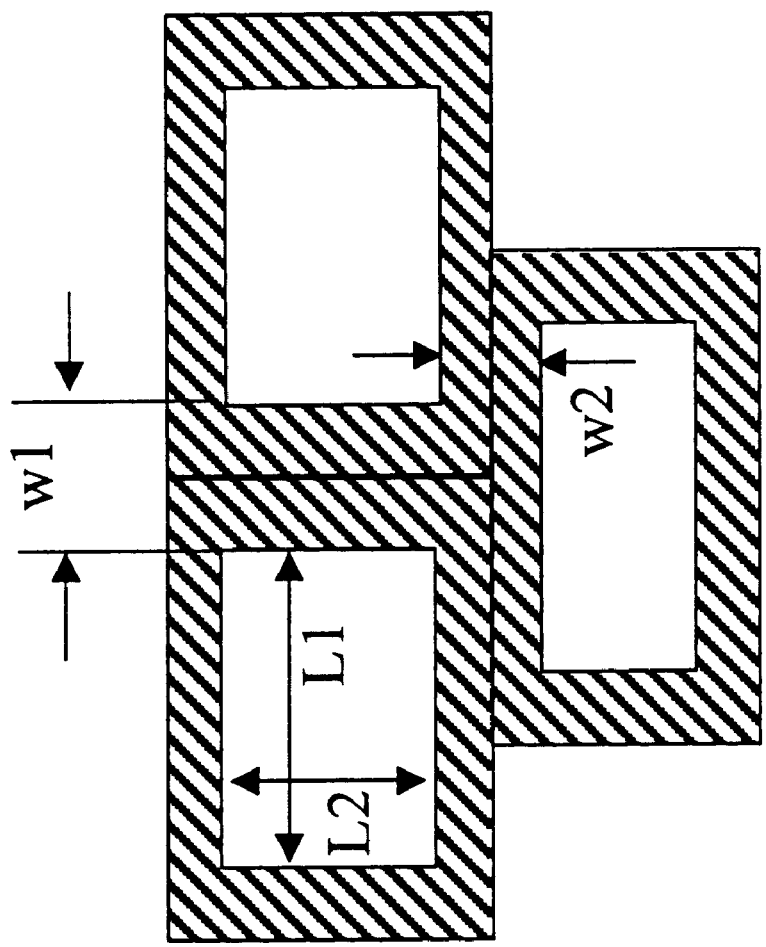
FIG. 4b is a diagram illustrating various dimensions of a cruciform bump formed around a pixel electrode in a multi-domain homeotropic aligned liquid crystal display according to the invention.

The height of the bump structure 401 is in the range of 0.5 $\mu$m to 4 $\mu$m and the width is 1 $\mu$m or more. The shape of the cross sectional side view of the bump can be convex with rounded top, convex with rectangular top, or of averaging tilt angle within 3° to 70°. The pixel size may range from 3 $\mu$m to 350 $\mu$m on a side. The arrangement of the pixels may be of rectangle or square. It may also be mosaic arrangement. Typically the pixel size is chosen to have a 1:3 aspect ratio for quasi-rectangular pixel. In the embodiment of the mosaic arrangement, the pixel is 127 $\mu$m long by 121 $\mu$m wide. The size of pixel aperture area L1 by L2 is 110 $\mu$m by 110 $\mu$m and the dimension W1 by W2 of the bump is 17 $\mu$m by 11 $\mu$m, as shown in FIG. 4b. This bump structure allows the optical response of the liquid crystal display in the invention to reach up to 25.37 ms.

The bump structure 401 shown in FIG. 4a serves as directors to pre-tilt the liquid crystal molecules with high tilt angles. The shimmer around the bump 401 structure can be blocked by the black matrix of a color filter. Therefore, the dark state of each pixel is very dark.

Figure 5:
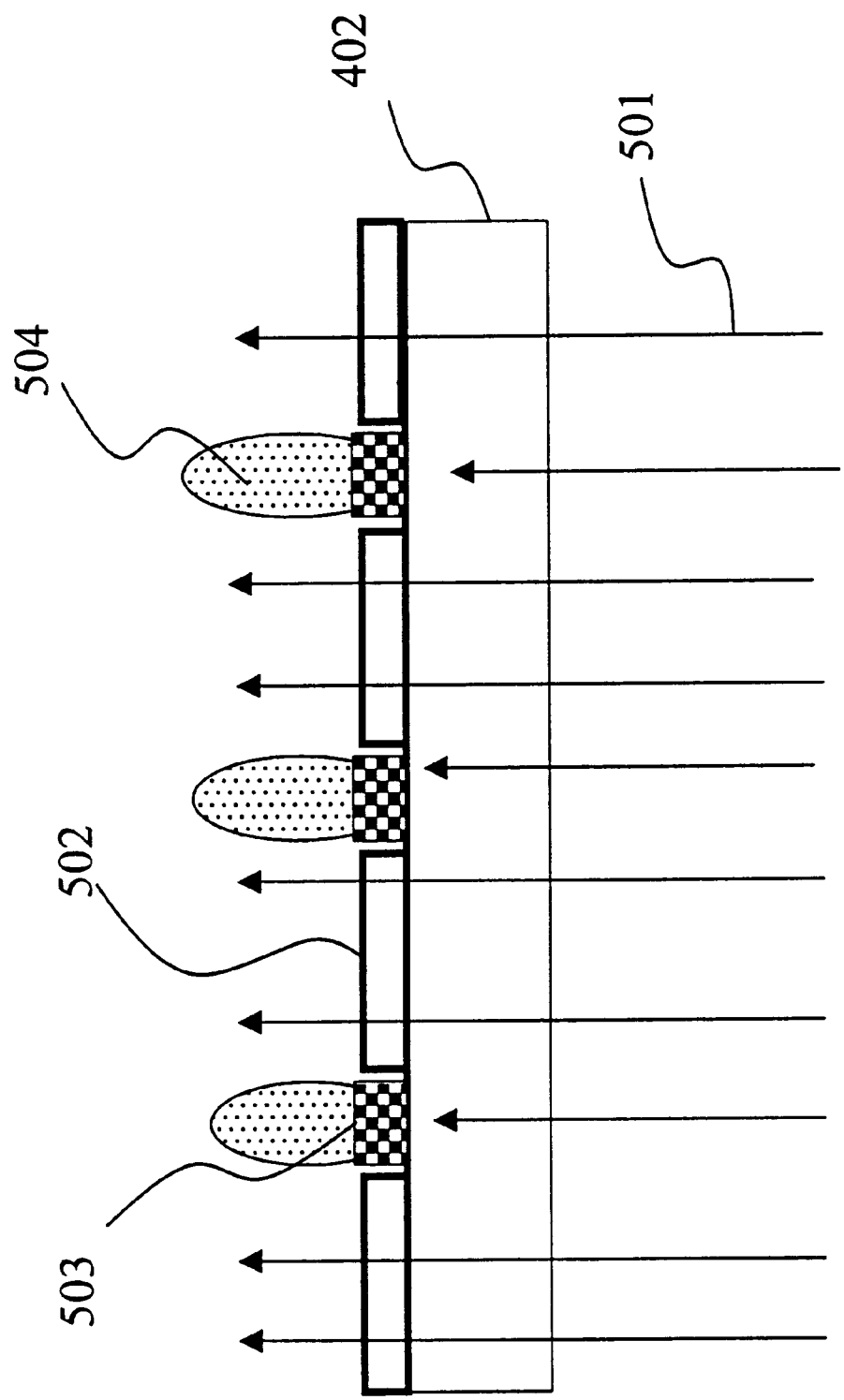
FIG. 5 is a diagram illustrating the BSE process for fabricating the cruciform bump shown in FIG. 4.

According to the invention, the bump structure shown in FIG. 4 can be fabricated by a standard photo-lithographic process. It may also be fabricated by a self-aligned BSE method. The advantages of the self-aligned BSE method are fast, clean and no pollution. No mask rubbing process is required and the problem of electric static damage is avoided. In addition, only one substrate needs to have the bump structure to form multi-domain cells. The process of manufacturing the bump structure comprises substrate formation, coating, BSE and development. The material for the bump structure may be positive or negative photoresist. Negative photoresist material includes vinyl-cinnami-acid or rubber style negative photoresist, and positive photoresist material may be novolak-NQD style or chemical amplify style. FIG. 5 is a diagram illustrating the BSE process for fabricating the cruciform bump shown in FIG. 4.

Referring to FIG. 5, the ultraviolet (UV) light 501 illuminates from the back side of the TFT substrate 402. Since the metal electrodes 502 on the TFT substrate 402 are opaque, the bump structure 504 on the bus line 503 is constructed on the top of these non-transparent metal bus lines by a standard photo-lithographic process. This process is accomplished by means of self-aligned exposure without using a photomask.

Figure 6:
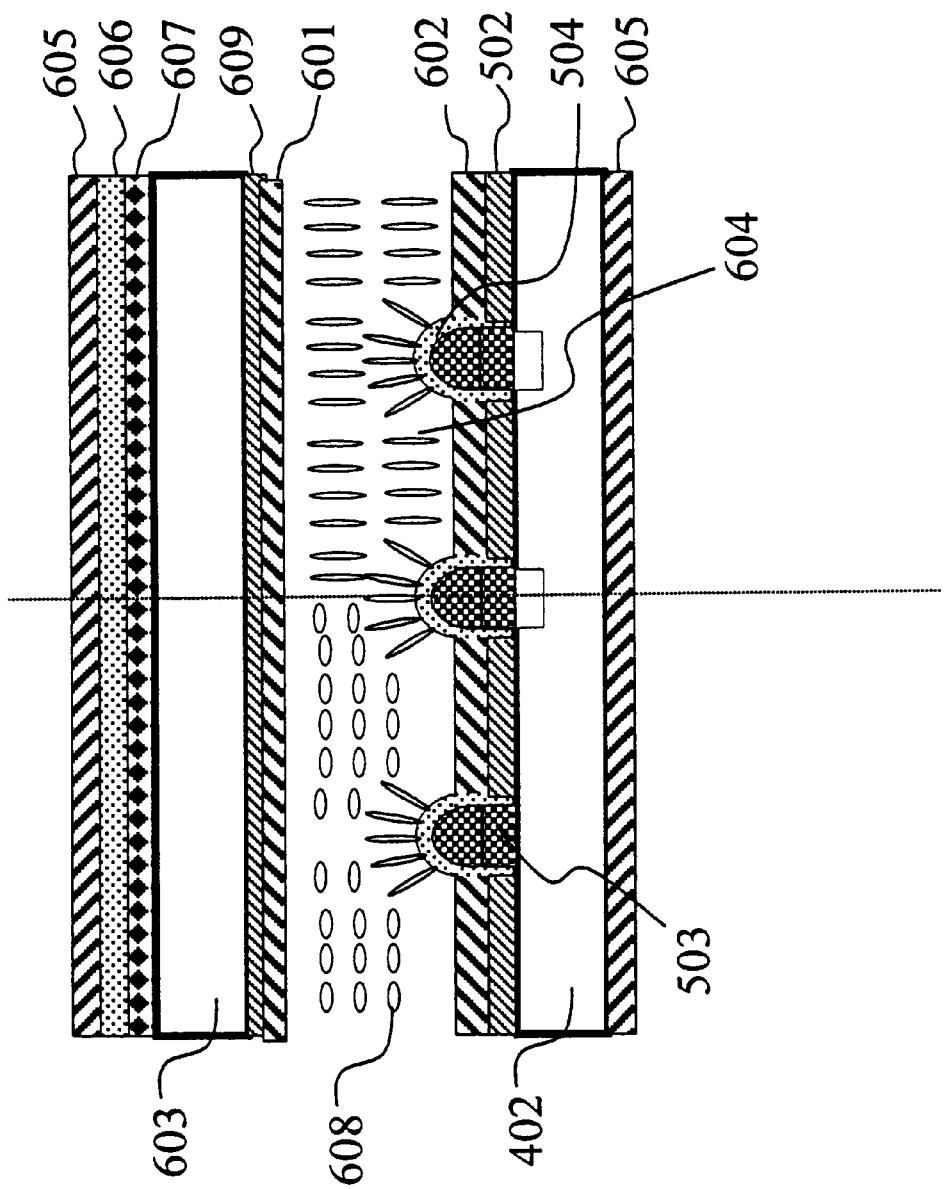
FIG. 6 shows the side view of the novel structure and the operation mechanism of a multi-domain homeotropic aligned liquid crystal display according to the invention.

FIG. 6 shows the side view of the novel structure and the operation mechanism of a multi-domain homeotropic aligned liquid crystal display according to the invention. Referring to FIG. 6, after self-aligned BSE, the alignment films 601 and 602 are printed on a common electrode 609 of a top color filter substrate 603 and the metal electrode 502 of the bottom TFT substrate 402 respectively. After assembling the substrates, nematic liquid crystal is injected into the cell.

Because of the alignment films 601 and 602, the liquid crystal directors are perpendicularly anchored on the boundaries of the bump structure 504. High pre-tilt angle around the pixel is introduced by the bump structure 504 without using rubbing process. The homeotropical aligned liquid crystals do not modulate the polarization of incident light. The liquid crystal molecules 604 are perpendicular to the electrode when the applied voltage is off (OFF state) as shown in the right hand side of FIG. 6. Since the LCD is sandwiched between crossed polarizers 605 and 605', the dark state is perfectly dark.

Normally, the compensators A-plate 606 and C-plate 607 are necessary for a homeotropical aligned LCD to eliminate the angular dependence of a dark state. As shown in the left hand side of FIG. 6, when the voltage is applied (ON state), the directors of liquid crystal molecules are reoriented and the liquid crystal molecules 608 are parallel to the electrode. The tilt directions are determined by the combination effect of a fringe field and the bump structure. The light intensity is modulated by the crossed polarizers due to the liquid crystal directors' field.

Figure 7A:
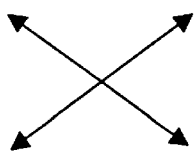
FIG. 7a shows the optical texture when the absorbing axis of crossed polarizers of a multi-domain homeotropic aligned liquid crystal display according to the invention are placed at ±45° directions respectively with a voltage being applied.
Figure 7A:
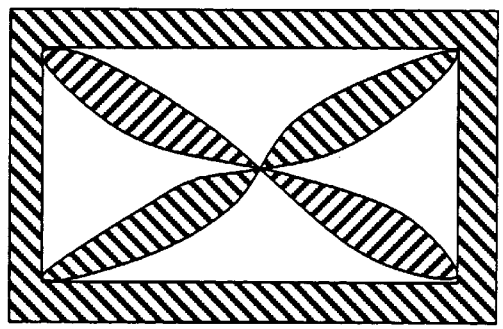
Figure 7A:
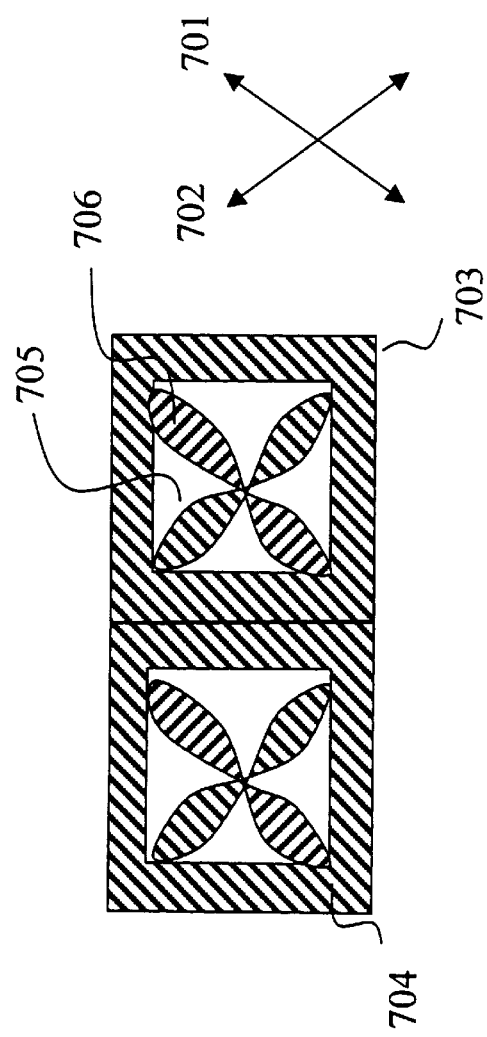

FIG. 7a shows the optical texture when the absorbing axis 701 and 702 of crossed polarizers of a multi-domain homeotropic aligned liquid crystal display of the present invention are placed at ±45° directions respectively with a voltage being applied. The shape of the pixel 703 in the left figure of FIG. 7a is quasi-square. The bump 704 is formed around the pixel electrode. The optical texture of the light transmitted region 705 changes from full dark to disclination texture 706. The pixel shape in the right figure of FIG. 7a is quasi-rectangle.

Figure 7B:
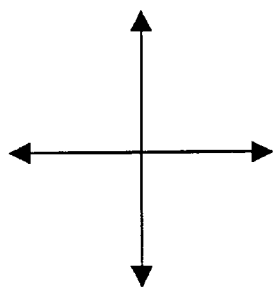
FIG. 7b shows the optical texture when the absorbing axis of crossed polarizers of a multi-domain homeotropic aligned liquid crystal display according to the invention are placed at 0° and 90° directions respectively with a voltage being applied.
Figure 7B:
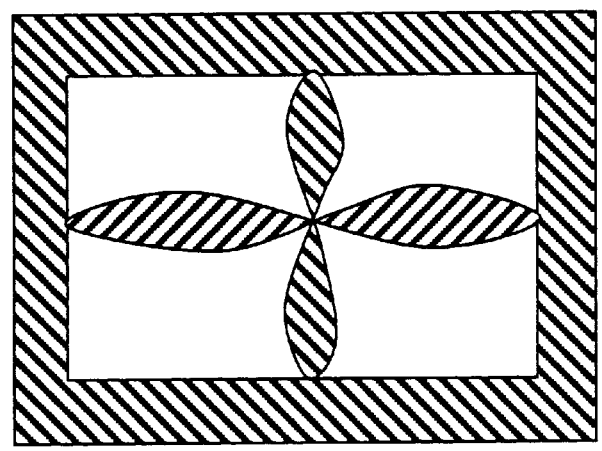
Figure 7B:
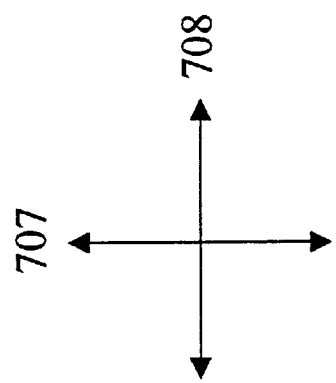
Figure 7B:

FIG. 7b shows the optical texture when the absorbing axis 707 and 708 of crossed polarizers are placed at 0° and 90° directions respectively with a voltage being applied. In FIG. 7b, the pixel shape in the left figure is quasi-square while the pixel shape in the right figure is quasi-rectangle. The disinclination texture in FIG. 7 is changed by the voltage applied. When a larger voltage is applied, the disinclination texture becomes narrower and the intensity also gets higher.

The bump structure shown in FIG. 4 can be formed by utilizing the BSE method without rubbing process and polymer stabilized process. It is simpler and cheaper than using a standard photo-lithographic procedure. Because it saves one photo-lithographic procedure, the problems of misalignment, smaller process window and possibly sacrificing the aperture ratio are all eliminated.

According to the invention, plural openings are further formed on pixel electrodes or common electrodes in order to obtain high quality images for the LCD display. The openings are preferably formed on the common electrodes. Standard photo-lithographic process can be used to fabricate the electrodes with openings. The pattern of the openings on the electrodes determines the characteristics of the multi-domain LCD cells. The shape of the opening patterns may be double-Y, X, multiple Xs, diagonal slot, vertical slot or multiple horizontal slots according to the invention. FIGS. 8(a)–8(f) illustrate these opening patterns respectively.

Figure 8B:
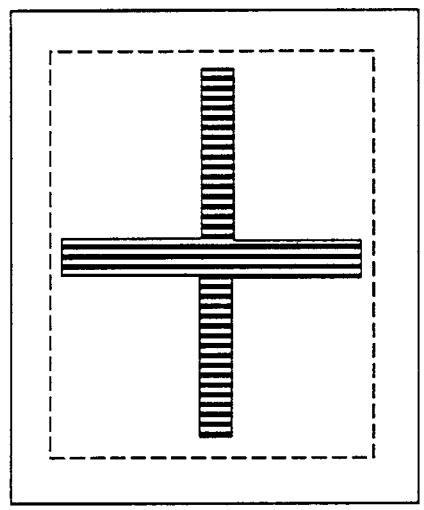
FIGS. 8(a)–8(f) show the electrode patterns on the pixel electrode or the common electrode of a multi-domain homeotropic aligned liquid crystal display according to the invention.
Figure 8A:
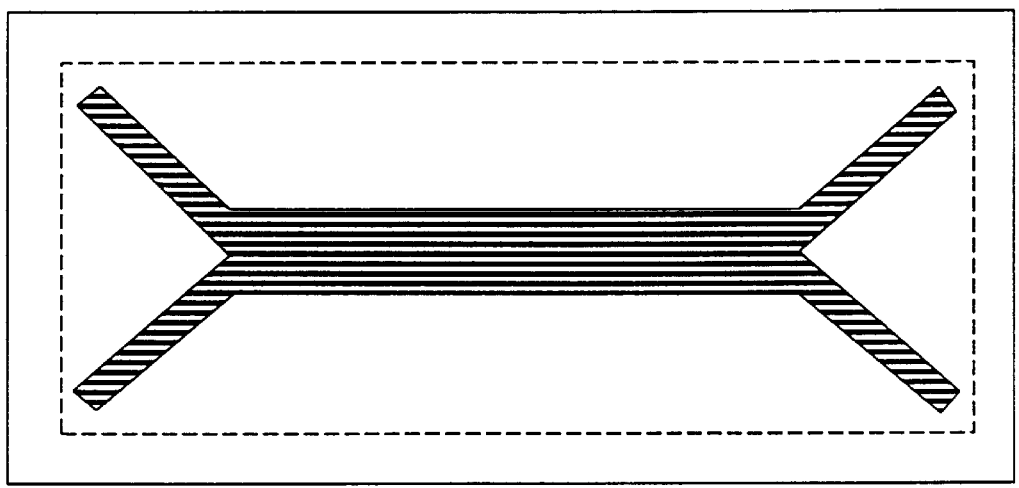
Figure 8D:
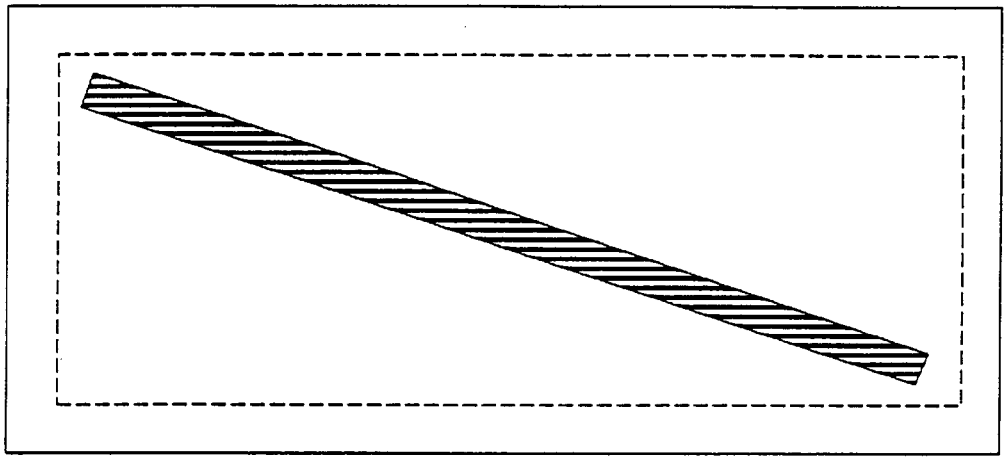
Figure 8C:
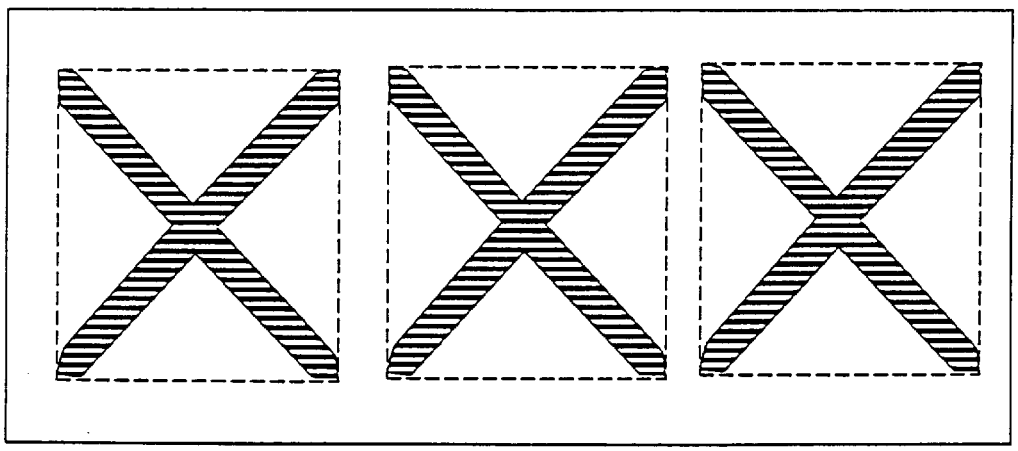
Figure 8F:
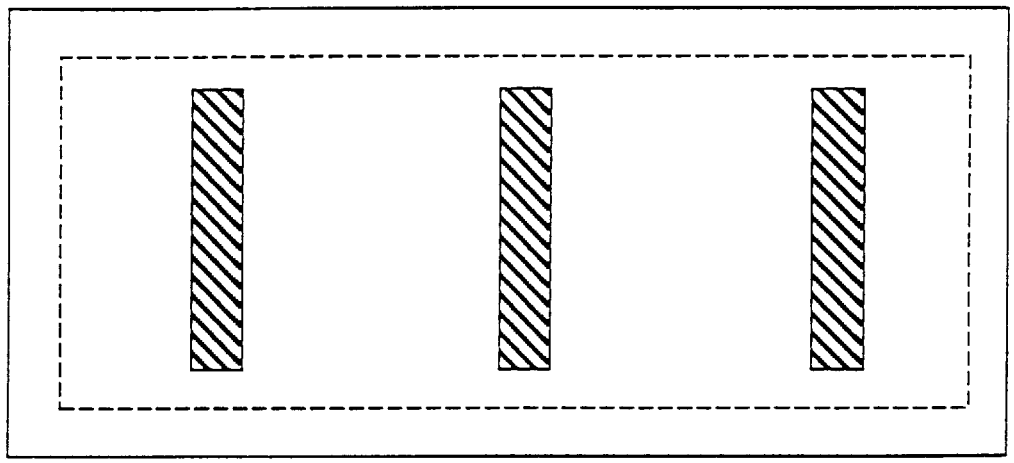
Figure 8E:
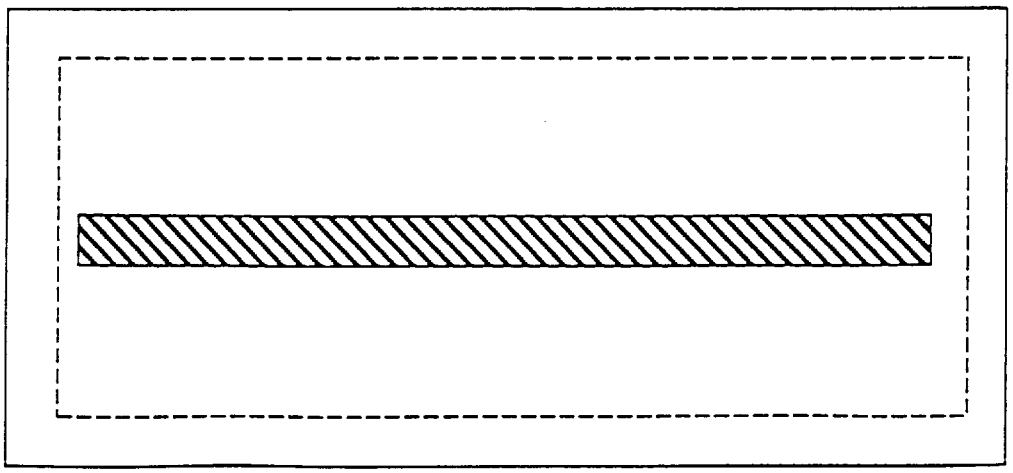

The pixels may be arranged as a rectangle or square. It may also be mosaic arrangement. In FIG. 8(e), the vertical slot opening at the central portion is disposed in parallel with the longer sides of the pixel and perpendicular to the shorter sides. In FIG. 8(f), the horizontal slot opening is disposed in parallel with the shorter sides of the pixel and perpendicular to the longer sides of the pixel.

Figure 9:
FIG. 9 shows the voltage-dependent transmittance curve in the multi-domain homeotropic aligned liquid crystal display according to the invention.

FIG. 9 shows the voltage-dependent transmittance curve in a multi-domain homeotropic aligned liquid crystal display with cruciform bump structure formed using the BSE method according to the invention. The liquid crystal directors in off state are perpendicularly aligned to the substrates and the boundaries of the bump structure. The multi-domain homeotropic aligned liquid crystal display panels are operated in normally-black mode. The shimmer around the bumps is blocked by the black matrix to ensure that the dark state is perfectly dark. The transmittance is very low when the applied voltages are smaller than the threshold voltage of 2.3 volts as shown in FIG. 9. The aperture ratio of the LCD is around 47%. It can reach up to 2.9% transmittance when a voltage of 5 volts is applied. This is about 55% light intensity of a conventional 90°-twisted nematic LCD, and is 20% higher than that of a conventional vertically aligned wide-viewing angle LCD.

Figure 10:
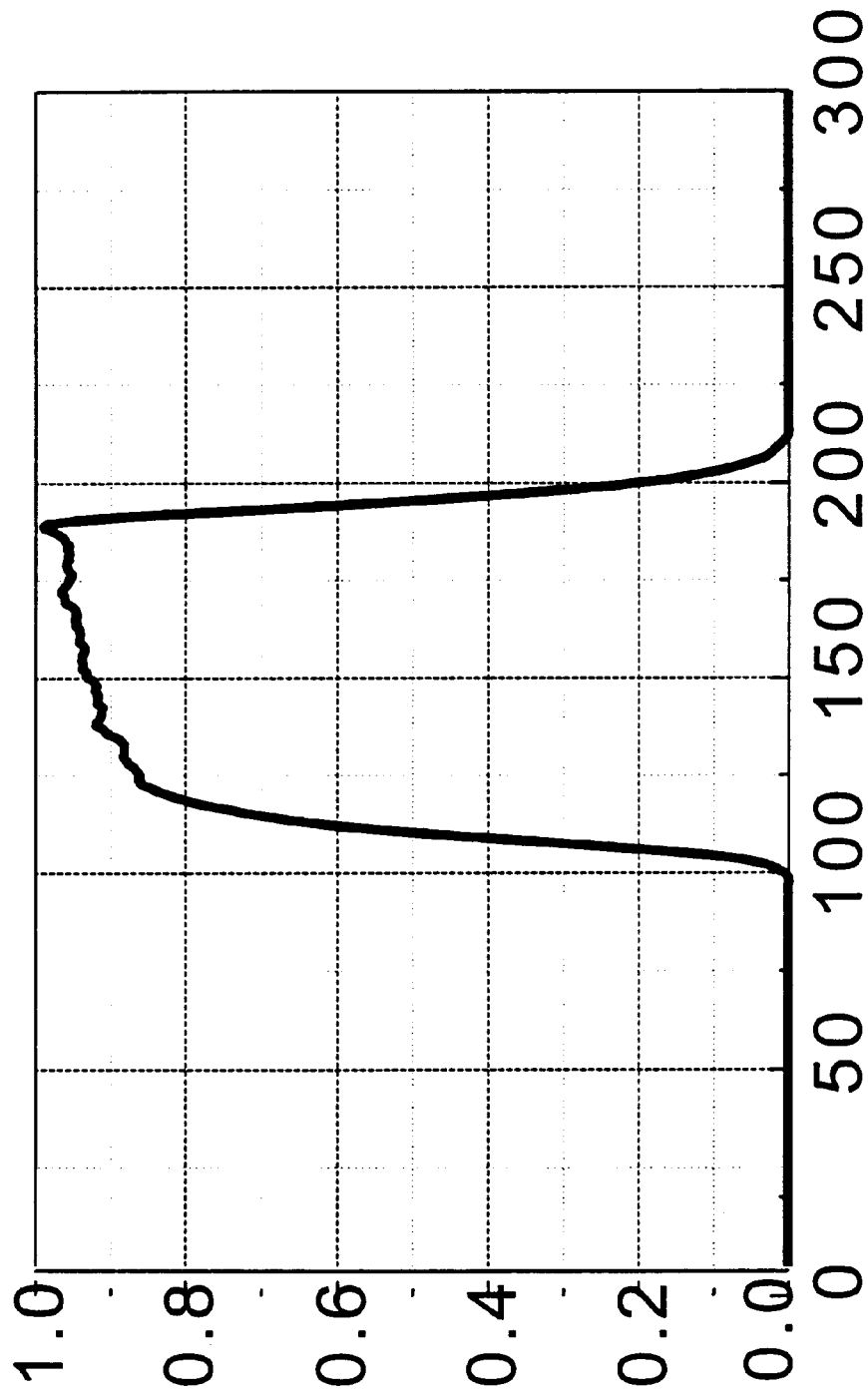
FIG. 10 shows the optical response in a multi-domain homeotropic aligned liquid crystal display according to the invention.

FIG. 10 shows the optical response in a multi-domain homeotropic aligned liquid crystal display according to the invention. The response is measured by switching the voltage between 0 and 5 volts. The rise time (10% to 90% of transmittance difference between 0 and 5 volts) is about 17 ms and the decay time (90% to 10% of transmittance difference between 0 and 5 volts) is about 11.5 ms. The total response time is about 28.5 ms which is fast enough for its applications.

Figure 11:
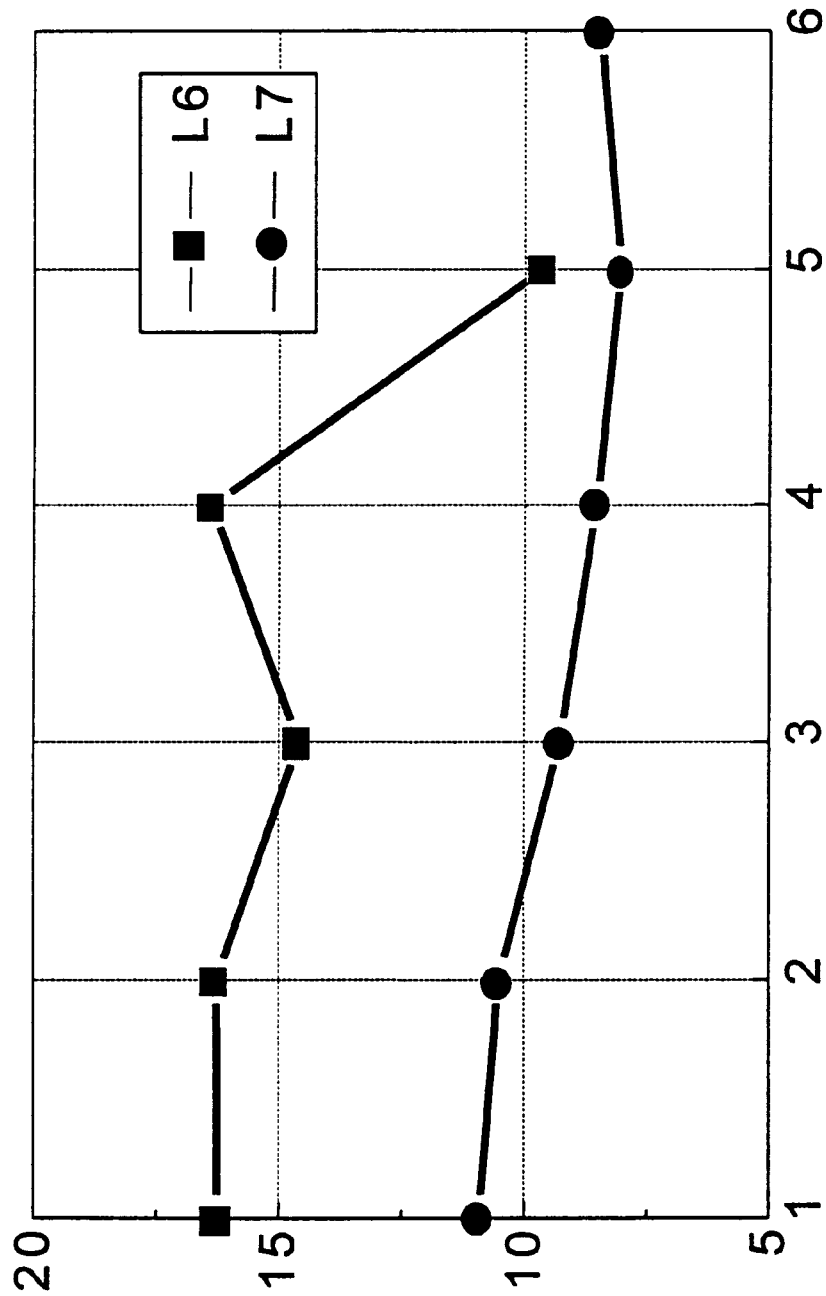
FIG. 11 shows the response between the gray levels in a multi-domain homeotropic aligned liquid crystal display according to the invention.

FIG. 11 shows the response between the gray levels in the multi-domain homeotropic aligned liquid crystal display of the present invention. The transmittance between 0 and 5 volts is divided into 8 gray levels, from level 0 to level 7. Referring to FIG. 11, line segments connected by square dots represent the rise time of switching from gray levels 1~6 to level 7 while line segments connected by circular dots represent the rise time of switching from gray levels 1~5 to level 6. The rise time of switching from gray levels 1~6 to level 7 (5 volts) is less than 11 ms, and 16.5 ms for gray levels 1~5 to level 6.

Figure 12:
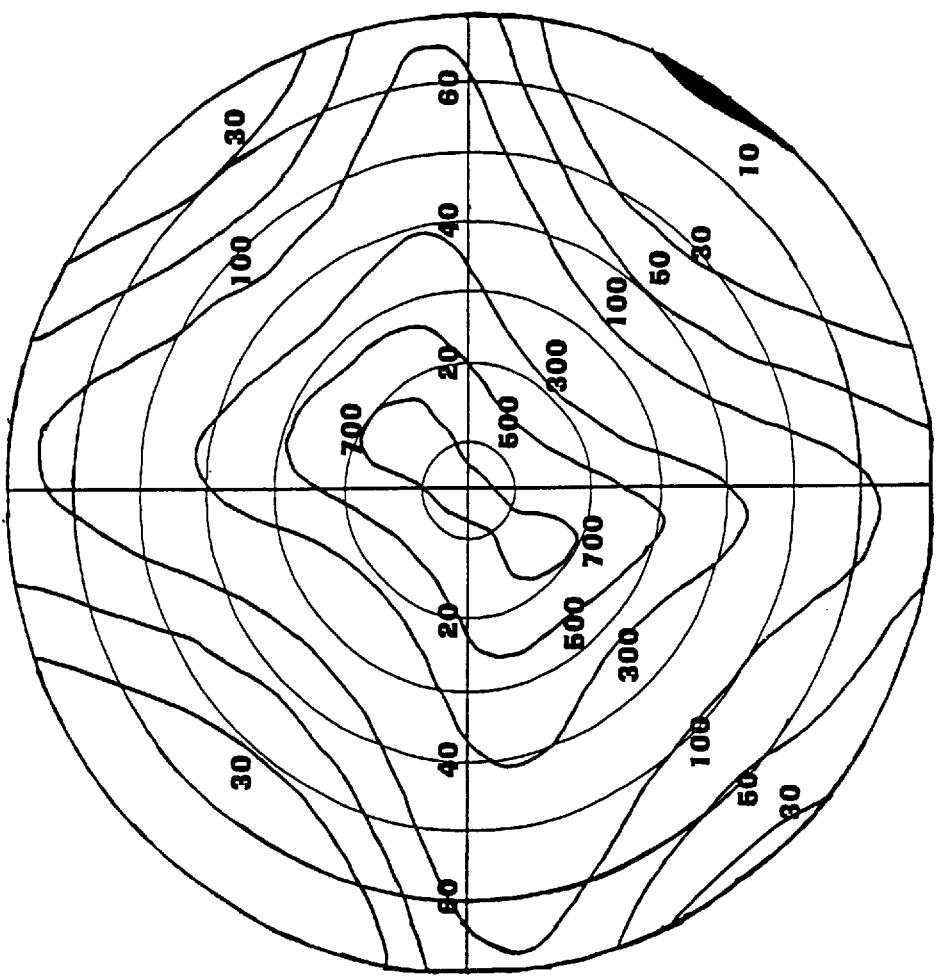
FIG. 12 shows the iso-contrast contours of a multi-domain homeotropic aligned liquid crystal display according to the invention with compensator A- and C-plates.

FIG. 12 shows the iso-contrast contours of a multi-domain homeotropic aligned liquid crystal display according to the invention with compensator A- and C-plates. Both compensation films are commercialized products. The viewing angle with contrast ratio CR=10 is about 70° from all viewing directions. In the horizontal and vertical directions, the CR is more than 200 with a viewing angle 50°. The maximum CR is more than 700.

Figure 13:
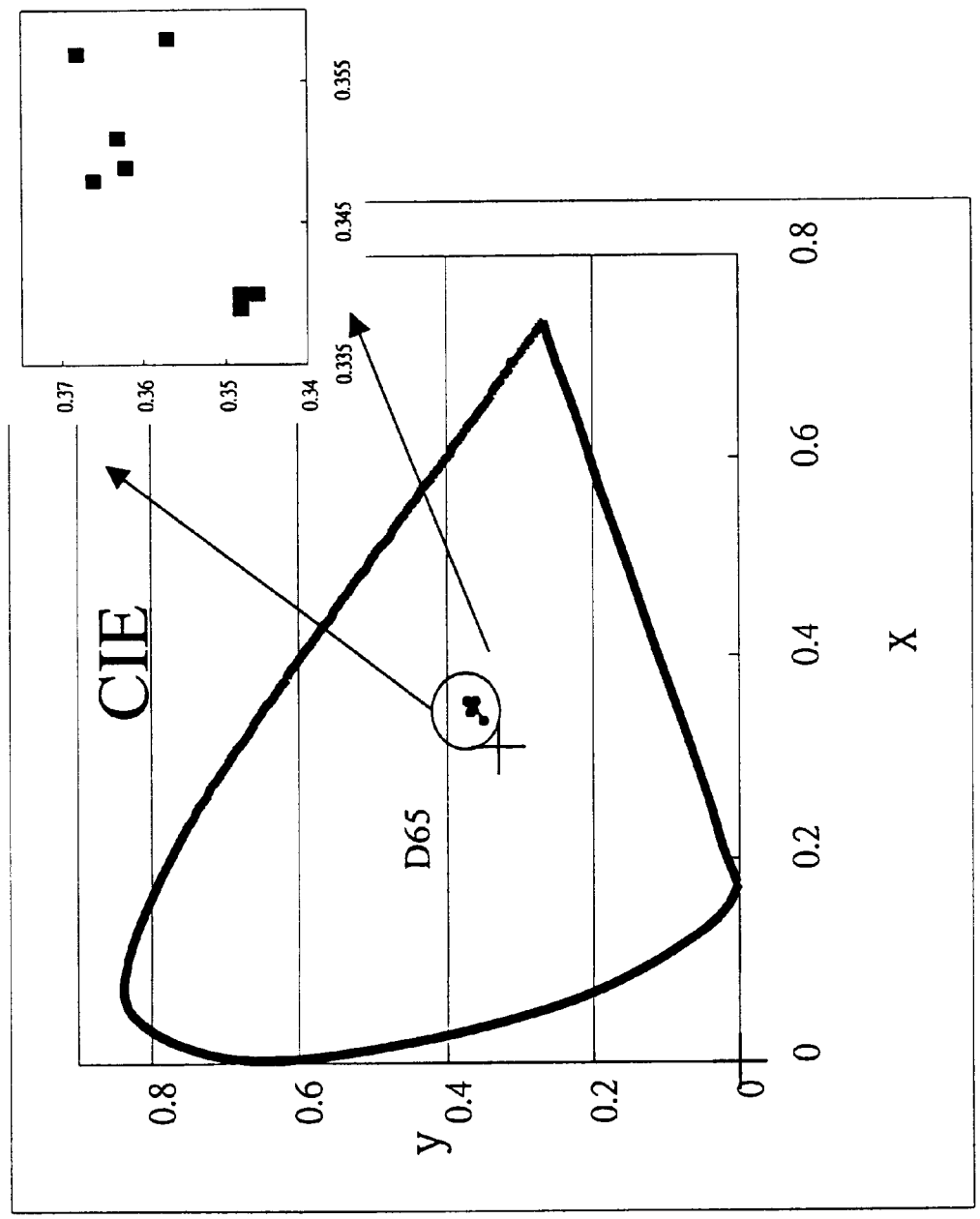
FIG. 13 shows the color shift in a multi-domain homeotropic aligned liquid crystal display according to the invention.

FIG. 13 shows the colorimetry in a multi-domain homeotropic aligned liquid crystal display according to the invention. The results are measured at white level at 70° in all azimuthal angles. The horseshoe-shaped area is the distribution range of the wavelength of visible light. Using point (0.313, 0.329) in CIE coordinate as the standard light source D65, the rectangular area from (0.335, 0.34) to (0.355, 0.37) is enlarged and shown at the upper-right corner of FIG. 13. Obviously, the range of the colorimetry is dense and closed to the standard light source D65. It means that the color dispersion is very small (0.018 in this embodiment) and the color of the white level will be independent of the viewing angle. The color dispersion is much less than that of a conventional 90°-twisted nematic LCD or a wide-viewing angle inplane switch (IPS) LCD. Therefore, the multi-domain homeotropic aligned LCD of the invention shows uniform color performance which is induced by the quasi-symmetric director field.

Although this invention has been described with a certain degree of particularity, it is to be understood that the present disclosure has been made by way of preferred embodiments only and that numerous changes in the detailed construction and combination as well as arrangement of parts may be restored to without departing from the spirit and scope of the invention as hereinafter set forth.

What is claimed is:

1. A multi-domain homeotropic aligned liquid crystal display comprising:
   a liquid crystal cell having a pixel electrode layer, a common electrode layer, a pair of parallel substrates, and liquid crystals fill ed between said parallel substrates;
   at least one crossed polarizer being attached outside said liquid crystal cell;
   compensation films being deposited between a crossed polarizer and a substrate; and
   a plurality of cruciform bump structures fabricated on at least one of said parallel substrates and each bump structure being formed around a pixel electrode of said pixel electrode layer.

2. The multi-domain homeotropic aligned liquid crystal display as claimed in claim 1, each of said bump structures having a height in the range of 0.5 $\mu$m to 4 $\mu$m and a width being 1 $\mu$m or more.

3. The multi-domain homeotropic aligned liquid crystal display as claimed in claim 1, said bump structures being made of a photoresist material.

4. The multi-domain homeotropic aligned liquid crystal display as claimed in claim 1, said pixel electrode layer being formed on one of said parallel substrates and said cruciform bump structures being fabricated on the substrate having said pixel electrode layer.

5. The multi-domain homeotropic aligned liquid crystal display as claimed in claim 4, the substrate having said pixel electrode layer further having thin film transistors formed thereon.

6. The multi-domain homeotropic aligned liquid crystal display as claimed in claim 5, said thin film transistors being made of amorphous silicon, single silicon, poly-silicon, or low temperature poly-silicon.

7. The multi-domain homeotropic aligned liquid crystal display as claimed in claim 1, said common electrode layer being formed on one of said parallel substrates and said cruciform bump structures being fabricated on the substrate having said common electrode layer.

8. The structure of a multi-domain homeotropic aligned liquid crystal display as claimed in claim 7, the substrate having said common electrode layer further having a color filter formed thereon.

9. The multi-domain homeotropic aligned liquid crystal display as claimed in claim 1, each pixel electrode corresponding to a pixel on said pixel electrode layer having at least one opening formed thereon.

10. The multi-domain homeotropic aligned liquid crystal display as claimed in claim 9, the shape of said at least one opening being double-Y, X, multiple Xs, diagonal slot, vertical slot or multiple horizontal slots.

11. The multi-domain homeotropic aligned liquid crystal display as claimed in claim 1, each common electrode corresponding to a pixel on said common electrode layer having at least one opening formed thereon.

12. The multi-domain homeotropic aligned liquid crystal display as claimed in claim 11, the shape of said at least one opening being double-Y, X, multiple Xs, diagonal slot, vertical slot or multiple horizontal slots.

13. The multi-domain homeotropic aligned liquid crystal display as claimed in claim 1, wherein two crossed polarizers are attached outside said liquid crystal cell.

14. The multi-domain homeotropic aligned liquid crystal display as claimed in claim 1, said compensation films having at least one negative birefrigence.

15. The multi-domain homeotropic aligned liquid crystal display as claimed in claim 1, said compensation films having at least one bi-axial film.

16. The multi-domain homeotropic aligned liquid crystal display as claimed in claim 1, said compensation films having negative birefrigence and uni-axial birefrigence.

17. The multi-domain homeotropic aligned liquid crystal display as claimed in claim 1, wherein a plurality of pixels are formed for said display, each pixel having a size ranging from 3 $\mu$m to 350 $\mu$m on a side, and being shaped as quasi-rectangle, quasi-square or mosaic arrangement.

18. The multi-domain homeotropic aligned liquid crystal display as claimed in claim 1, said pixel electrode layer having pixel electrodes and each pixel electrode being a pixel unit driven by an active device of an active matrix.

19. The multi-domain homeotropic aligned liquid crystal display as claimed in claim 18, said pixel electrodes being co-plane with said active matrix.

20. The multi-domain homeotropic aligned liquid crystal display as claimed in claim 18, said pixel electrodes being above said active matrix.

21. The multi-domain homeotropic aligned liquid crystal display as claimed in claim 18, said pixel electrodes being below said active matrix.

22. The multi-domain homeotropic aligned liquid crystal display as claimed in claim 18, said active device being a thin film transistor.

23. The multi-domain homeotropic aligned liquid crystal display as claimed in claim 18, said active device being a plasma address device.

24. A method of fabricating cruciform bump structures for a multi-domain homeotropic aligned liquid crystal display, said liquid crystal display having a pixel electrode layer, a common electrode layer, and a pair of parallel substrates filled with liquid crystals, comprising the steps of:
   (a) preparing one of said parallel substrates;
   (b) coating a layer of photoresist on the top surface of said substrate;
   (c) exposing said photoresist layer by using a self-aligned back side exposure method; and
   (d) developing said photoresist layer to form said bump structures by removing photoresist under exposed area and leaving photoresist on unexposed area.

25. The method of fabricating cruciform bump structures for a multi-domain homeotropic aligned liquid crystal display as claimed in claim 24, the substrate prepared in said step (a) having said pixel electrode layer formed thereon.

26. The method of fabricating cruciform bump structures for a multi-domain homeotropic aligned liquid crystal display as claimed in claim 24, the substrate prepared in said step (a) having said common electrode layer formed thereon.

27. The method of fabricating cruciform bumps structure for a multi-domain homeotropic aligned liquid crystal display as claimed in claim 26, the substrate prepared in said step (a) further having a color filter formed thereon.

28. The method of fabricating cruciform bumps structure for a multi-domain homeotropic aligned liquid crystal display as claimed in claim 26, the substrate prepared in said step (a) further having a thin film transistor formed thereon.

29. The method of fabricating cruciform bump structures for a multi-domain homeotropic aligned liquid crystal display as claimed in claim 25, said back side exposure method further comprising the steps of:

(c1) illuminating the back side of the substrate prepared in step (a) with ultraviolet light, the substrate being a thin film transistor substrate having bus lines and non-transparent electrodes; and (c2) fabricating said bump structures above said bus line on top of said non-transparent electrodes by a standard photo-lithographic process.

\* \* \* \* \*